(12) United States Patent
Knighton et al.

(10) Patent No.: US 7,050,585 B2
(45) Date of Patent: May 23, 2006

(54) IMAGING SYSTEM MONITORED OR CONTROLLED TO ENSURE FIDELITY OF FILE CAPTURED

(75) Inventors: Mark S. Knighton, Santa Monica, CA (US); David S. Agabra, Pacific Palisades, CA (US); William D. McKinley, Marina Del Rey, CA (US)

(73) Assignee: NextEngine, Inc., Santa Monica, CA (US)

( * ) Notice: Subject to any disclaimer, the term of this patent is extended or adjusted under 35 U.S.C. 154(b) by 955 days.

(21) Appl. No.: 09/927,730

(22) Filed: Aug. 9, 2001

(65) Prior Publication Data

US 2002/0031223 A1    Mar. 14, 2002

Related U.S. Application Data

(63) Continuation-in-part of application No. 09/660,811, filed on Sep. 13, 2000.

(51) Int. Cl.
*G06F 11/30* (2006.01)
(52) U.S. Cl. ............... 380/201; 380/230; 713/193; 713/194; 713/200; 713/201
(58) Field of Classification Search ................ 380/201, 380/230; 713/193, 194, 200, 201
See application file for complete search history.

(56) References Cited

U.S. PATENT DOCUMENTS

| | | |
|---|---|---|
| 3,636,250 A | 1/1972 | Haeff |
| 4,089,608 A | 5/1978 | Hoadley |
| 4,564,295 A | 1/1986 | Halioua |
| 4,590,608 A | 5/1986 | Chen et al. |
| 4,641,972 A | 2/1987 | Halioua et al. |
| 4,657,394 A | 4/1987 | Halioua |
| 4,705,401 A | 11/1987 | Addleman et al. |
| 4,724,525 A | 2/1988 | Purcell et al. |
| 4,737,032 A | 4/1988 | Addleman et al. |
| 4,802,759 A | 2/1989 | Matsumoto et al. |
| 4,846,577 A | 7/1989 | Grindon |
| 5,067,817 A | 11/1991 | Glenn |
| 5,131,844 A | 7/1992 | Marinaccio et al. |
| 5,132,839 A | 7/1992 | Travis |
| 5,135,309 A | 8/1992 | Kuchel et al. |
| 5,175,601 A | 12/1992 | Fitts |
| 5,216,817 A | 6/1993 | Misevich et al. |
| 5,218,427 A | 6/1993 | Koch |
| 5,231,470 A | 7/1993 | Koch |
| 5,285,397 A | 2/1994 | Heier et al. |
| 5,289,264 A | 2/1994 | Steinbichler |

(Continued)

FOREIGN PATENT DOCUMENTS

DE    4134546 A1    8/1993

(Continued)

OTHER PUBLICATIONS www.pointcloud.com/pages/Home.html, "Point Cloud," 5 pages.

(Continued)

*Primary Examiner*—Thomas R. Peeso
(74) *Attorney, Agent, or Firm*—Blakely, Sokoloff, Taylor & Zafman, LLP

(57) ABSTRACT

A three-dimensional imaging system providing certification over a distributed network. By monitoring or controlling image capture from a trusted environment, the fidelity of the record of the image captured is certified by the operator of the trusted environment. An image record may be archived and an audit trail maintained for any image of interest.

37 Claims, 10 Drawing Sheets

U.S. PATENT DOCUMENTS

| | | | |
|---|---|---|---|
| 5,307,292 A | | 4/1994 | Brown et al. |
| 5,315,512 A | | 5/1994 | Roth |
| 5,335,317 A | | 8/1994 | Yamashita et al. |
| 5,337,149 A | | 8/1994 | Kozah et al. |
| 5,377,011 A | | 12/1994 | Koch |
| 5,408,630 A | * | 4/1995 | Moss ..................... 711/112 |
| 5,414,647 A | | 5/1995 | Ebenstein et al. |
| 5,432,622 A | | 7/1995 | Johnston et al. |
| 5,471,303 A | | 11/1995 | Ai et al. |
| 5,531,520 A | | 7/1996 | Grimson et al. |
| 5,579,516 A | * | 11/1996 | Van Maren et al. ........... 707/1 |
| 5,592,563 A | | 1/1997 | Zahavi |
| 5,602,936 A | * | 2/1997 | Green et al. ............... 382/140 |
| 5,608,905 A | * | 3/1997 | Weinstein .................. 707/205 |
| 5,611,066 A | * | 3/1997 | Keele et al. ............... 711/100 |
| 5,611,147 A | | 3/1997 | Raab |
| 5,617,645 A | | 4/1997 | Wick et al. |
| 5,627,771 A | | 5/1997 | Makino |
| 5,636,025 A | | 6/1997 | Bieman et al. |
| 5,646,733 A | | 7/1997 | Bieman |
| 5,659,730 A | * | 8/1997 | Kelley et al. ................. 707/3 |
| 5,661,667 A | | 8/1997 | Rueb et al. |
| 5,678,546 A | | 10/1997 | Truppe |
| 5,689,446 A | | 11/1997 | Sundman et al. |
| 5,704,897 A | | 1/1998 | Truppe |
| 5,747,822 A | | 5/1998 | Sinclair et al. |
| 5,771,310 A | | 6/1998 | Vannah |
| 5,794,356 A | | 8/1998 | Raab |
| 5,799,082 A | | 8/1998 | Murphy et al. |
| 5,805,289 A | | 9/1998 | Corby, Jr. et al. |
| 5,831,621 A | | 11/1998 | Pito |
| 5,864,640 A | | 1/1999 | Miramonti et al. |
| 5,870,220 A | | 2/1999 | Migdal et al. |
| 5,880,846 A | | 3/1999 | Hasman et al. |
| 5,907,359 A | | 5/1999 | Watanabe |
| 5,910,845 A | | 6/1999 | Brown |
| 5,944,598 A | | 8/1999 | Tong et al. |
| 5,988,862 A | | 11/1999 | Kacyra et al. |
| 5,995,650 A | | 11/1999 | Migdal et al. |
| 5,999,641 A | | 12/1999 | Miller et al. |
| 6,057,909 A | | 5/2000 | Yahav et al. |
| 6,091,905 A | | 7/2000 | Yahav et al. |
| 6,100,517 A | | 8/2000 | Yahav et al. |

FOREIGN PATENT DOCUMENTS

| | | |
|---|---|---|
| EP | 09074536 | 3/1997 |
| EP | 0 867 259 | 9/1998 |
| WO | WO 96/02106 | 1/1996 |
| WO | WO 99/41900 | 8/1999 |
| WO | WO 01/81859 | 11/2001 |
| WO | WO 02/23887 | 3/2002 |

OTHER PUBLICATIONS www.inharmonytech.com/venus3d.index.html, "Introducing Venus 3D," 4 pages.

deskeng.com/3dd.htm, "Desktop Engineering, The Complete Computing Resource for Engineers," 1977 Helmers Publishing, Inc., 1 page.

www.geometrixinc.com/mainwin.html, "Who says you can't build Rome in a day?", 4 pages.

* cited by examiner

IMAGING SYSTEM MONITORED OR CONTROLLED TO ENSURE FIDELITY OF FILE CAPTURED

RELATED CASES

This is a continuation-in-part of Ser. No. 09/660,811, filed on Sep. 13, 2000, entitled DIGITAL IMAGING SYSTEM HAVING DISTRIBUTION CONTROLLED OVER A DISTRIBUTED NETWORK.

BACKGROUND

1. Field of the Invention

The invention relates to three-dimensional imaging. More specifically, the invention relates to capture and distribution of three-dimensional digital images.

2. Background

Pictures have long been used to prove the condition of objects photographed. Such proof may arise in the context of insurance claims, lawsuits, etc. With the advent of digital photography and the proliferation of software for manipulation of digital pictures, the reliability of pictures has diminished and the opportunity for fraud has increased.

In the case of digital pictures, once downloaded from the camera to the computer, the user typically has complete access to all the pixels that make up the image. Thus, a marginally computer savvy teenager with Adobe Photoshop™ can generate very realistic, yet fraudulent digital images. With a host of digital images now posted on the Internet and digital images generally, there is an ongoing credibility gap in connection with the fidelity of such images posted when compared with the image actually captured.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
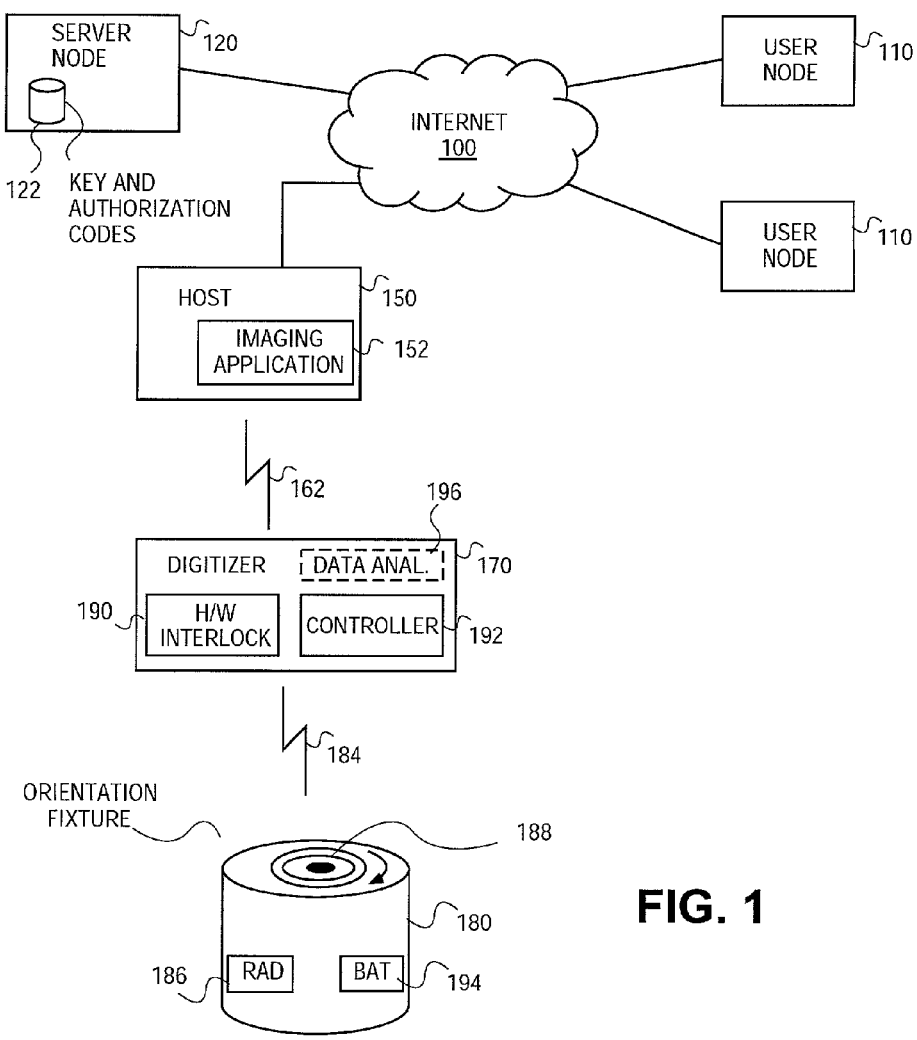
FIG. 1 is a block diagram of a system of one embodiment of the invention.

FIG. 1 is a block diagram of a system of one embodiment of the invention. The distributed network 100 such as the Internet provides an interconnection between a plurality of user nodes 110, a server node 120 and a host 150. Server node 120 may be any conventional server or a collection of servers to handle traffic and requests over the distributed network. User nodes may be discrete computers running a web browser, a corporate network, another server site, or any other node on the distributed network. Host 150 may be a computer (laptop, desktop, hand-held, server, workstation, etc.), an internet appliance or any other device through which data may be forwarded across the distributed network.

The host 150 may communicate over a wired link such as a universal serial bus (USB) or wireless link 162 to a digitizer 170. The digitizer 170 may be any of the myriad noncontact digitizers. One suitable digitizer is described in copending patent application Ser. No. 09/660,809, entitled DIGITIZER USING INTENSITY GRADIENT TO IMAGE FEATURES OF THREE-DIMENSIONAL OBJECTS and assigned to the assignee of the instant application.

In one embodiment, digitizer 170 is physically independent of an orientation fixture 180. For user convenience, it is desirable to minimize space permanently allocated to the system and minimize setup time. Most users will not be able to allocate sufficient space to leave the system configured for use at all times. The user will therefore be required to reintroduce some portion of the system prior to each use. The need to swap cables and otherwise rewire serves as a significant deterrent to widespread consumer adoption.

As used herein, "physically independent" means that no mechanical or wired electrical connection must exist between the physically independent units during operation. By way of example and not limitation, two devices coupled together by an electrical signaling wire either directly or through a host computer, are not physically independent, whereas two devices that have no physical coupling and communicate over a wireless link are deemed "physically independent." Connection to a common power source, e.g., two outlets in a house, is not deemed to destroy physical independence.

Orientation fixture 180 repositions an object to be digitized by digitizer 170 such that different aspects of the object are exposed relative to the digitizer at different points in time. In one embodiment the orientation fixture 180 is a turntable. One suitable turntable is described in copending application Ser. No. 09/660,810 entitled WIRELESS TURNTABLE and assigned to the assignee of the instant application. Orientation fixture 180 may also be a robotic arm or other robotic device, or may be a turntable in conjunction with a robotic arm or other robotic device. Other mechanisms that are capable of exposing different aspects of an object relative to the digitizer are deemed to be within the ambit of orientation fixtures.

As previously noted the orientation fixture is physically independent of the digitizer. One premise of the system is relative ease of setup to facilitate wide acceptance. Thus, with the physical independence it is desirable that the digitizer 170 and orientation fixture 180 be able to "find" each other. To that end, the digitizer 170 may be equipped to sweep an area looking with its sensing apparatus for a feature of the orientation fixture 180. The orientation fixture 180 may include a feature such as indicia, for example, acquisition indicia 188, or may contain some other physically observable structure that permits the digitizer to identify and acquire the orientation fixture 180 without the user introducing or removing a separate reference object. Acquiring the orientation fixture may permit, for example, any of automatic calibration of the digitizer, automatic determination of the relative position of the digitizer and orientation fixture, and fixture's orientation or condition. In one embodiment, imaging the feature provides an indication of focal distance as the perspective of the feature varies in a known way with distance. Calibration may be performed by imaging the feature and comparing the results to a set of reference data corresponding to the feature. In this manner the digitizer settings can be automatically optimized to provide the best available accuracy under existing conditions. Alternatively, the calibration can be performed based on a reference target or path entirely within the digitizer.

Alternatively, the orientation fixture may have a localized radiation source 186, which permits the digitizer 170 to sweep and identify the location of the orientation fixture based on the localized radiation from radiation source 186. It is also within the scope and contemplation of the invention to have the orientation fixture 170 position itself relative to the digitizer, such that the orientation fixture controls the acquisition by the digitizer 170 of the orientation fixture 180 and the object to be oriented thereby. In the system of such embodiment the orientation fixture would likely be a mobile robotic unit.

In one embodiment, the digitizer communicates with the orientation fixture across a wireless link 184 to coordinate the orientation of the object with image capture by the digitizer. The wireless link may be infrared ("IR"), radio frequency ("RF"), optical signaling, or any other mode of wireless communication. In one embodiment the orientation fixture 180 includes a self contained power source 194 such as a battery. The self-contained power source 194 may also be a solar panel, fuel cell, or any other suitable power source.

In one embodiment of the invention, digitizer 170 captures information about an object positioned by orientation fixture 180 from which a three-dimensional model can be derived. Controller 192 in digitizer 170 controls the coordination between the data capture by digitizer 170 and aspect change by the orientation fixture 180. It is within the scope and contemplation of the invention for the controller to reside in the host, the digitizer, the orientation fixture or in an independent unit. References to the controller herein are deemed to include without limitation all of these options. The digitizer 170 may also include a data analyzer 196 that reviews captured data to find errors, anomalies or other points of interest that warrant further investigation, including possibly rescanning the corresponding area. After any corrective action, the data captured by digitizer 170 is passed to the host 150, which renders the three-dimensional model from the data. The host 150 may perform compression or any other manipulation of the data known in the art. The three-dimensional model may then be sent over distributed network 100 to remote nodes such as user nodes 110 or a server node 120. This provides maximum ease of distribution across the distributed network 100.

In some cases, control of distribution of information captured by the digitizer is desirable, for example, to facilitate administration of user fees. To that end, in one embodiment the digitizer is provided with a hardware interlock 190 which prevents the system from operating without first receiving authorization. Such authorization may be provided by the server node 120 sending authorization data across the distributed network. Alternative locking mechanisms such as software or firmware-based locking mechanisms may also be employed either within the digitizer 170 or the host 150. Further security of the system can be affected by requiring an imaging application 152 on the host 150 to provide a valid digital signature in addition to the authorization data before enabling capture and/or transfer of captured data from the digitizer 170 to the host 150.

Some embodiments of the digitizer 170 may encrypt the data captured prior to sending it to the host 150. In that event, unless the host is able to decrypt the data to render it, it may forward it on to the server node 120 across the distributed network and subsequent rendering of the image or three-dimensional model would occur on the server node 120. In this manner, the local user does not have access to the data from which the three-dimensional model may be derived unless a key is provided. In still another embodiment, the host 150 may include encryption capabilities and encrypt the rendered image before forwarding it on to the server node 120. Keying information may be provided to the digitizer and/or the host by the server node 120. The server node may maintain keying information and authorization data in a local database 122. Once the three-dimensional data is safely controlled by the server node 120, access to the data may be made available for free or at cost to the user nodes 110 or back to the host 150.

The digitizer may also include a field programmable gate array ("FPGA") or other reconfigurable logic unit. In such case, the server node periodically may reprogram the FPGA to implement an updated or enhanced algorithm for processing or security purposes, for example, as subsequently developed.

Figure 2:
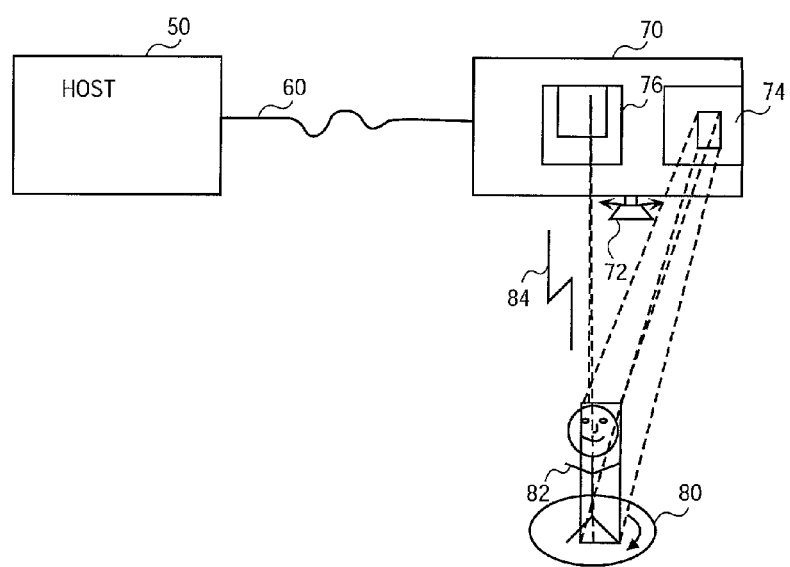
FIG. 2 is a block diagram of a system of one embodiment of the invention.

FIG. 2 is a block diagram of a subsystem of one embodiment of the invention. The subsystem of FIG. 2 may be inserted in place of host 150, digitizer 120 and orientation fixture 180 of FIG. 1. Digitizer 70 is coupled to a host 50. This coupling may be by a bus 60 such as the Universal Serial Bus (USB), IEEE 1394 bus, or any other suitable data transfer system. It is also within the scope and contemplation of the invention for the digitizer to communicate with the host via a wireless interconnection. Host 50 may be a personal computer, a work station, an internet appliance, or any other device that provides sufficient intelligence and processing power to render images from the data obtained by the digitizer. The digitizer 70 captures image data and may forward it to the host 50 for rendering. In this way, the processing on the digitizer 70 may be limited, permitting lower cost construction. It is also within the scope and contemplation of the invention for the digitizer to render the image and deliver it directly to a distributed network. It is further within the scope and contemplation of the invention for the digitizer to deliver the data to a distributed network for rendering on a remote node.

The digitizer 70 includes a projector to project a stripe of white light through a projection window 74 onto a remote object such as a person 82 on a turntable 80 remote from the digitizer. The digitizer also contains an image sensing array (ISA) aligned with an image capture window 76 which captures the image of the object 82 within a focal zone. In one embodiment, the ISA is a linear charge coupled device (CCD) or complementary metal oxide semiconductor (CMOS) sensor, and the focal zone is a line on the target object. In some embodiments, the digitizer includes a base 72 about which the upper unit, including the projector and the ISA, can rotate in either direction. This permits the focal line to be swept back and forth across a target object through an arc. This sweeping reduces the loss of detail in the captured image that results from shadowing on the object from the perspective of an immobile focal line. The digitizer 70 also includes a wireless interface to communicate with a turntable 80 via a wireless link 84.

Turntable 80 may be the type described in co-pending application entitled WIRELESS TURNTABLE, Ser. No.

09/660,810, assigned to the assignee of the instant application. Via wireless link 84, the digitizer sends commands to the turntable 80 and receives from the turntable indications of the angular position of the turntable surface relative to a home position. When the digitizer is activated, it searches for the turntable 80 by sending a signal to which the turntable 80 is required to respond. If the turntable responds, the digitizer looks for a predetermined pattern that is expected to be present on the turntable surface. For example, the pattern may be concentric circles on the turntable surface. In such case, based on the image captured, the digitizer can both find the turntable and determine its distance from the digitizer. Then after the response is received, the digitizer sends a "go home" signal to the turntable. In some embodiments, the digitizer sends acceleration and rotation profiles to the turntable to control its rotation. Each profile may be retained in firmware on the digitizer or downloaded from host 50.

Generally speaking, the projection portion of the digitizer 70 is retained in fixed relation to the imaging portion. The projection portion produces a light stripe as noted previously on the object 82. By either sweeping the light stripe back and forth through the focal line or by mechanically blocking the stripe at a known rate, the intensity gradient can be created. In one embodiment, the blocking is from 0% to 100% during a cycle. Because the ISA integrates the illumination over time, the outline of a three-dimensional surface is reflected in the data captured by the ISA. This is because protruding features will remain illuminated longer. Accordingly, more photons are captured by the ISA corresponding to those features. After repeating this process one stripe at a time as the object is rotated by turntable 80 or through the course of sweeping the entire digitizer back and forth as it rotates about the base, cost effective three-dimensional imaging is effected. The digitizer may also be used to capture high resolution scans of two dimensional objects by sweeping back and forth across the object. This feature is particularly desirable in the context of digitizing works of art.

Figure 3:
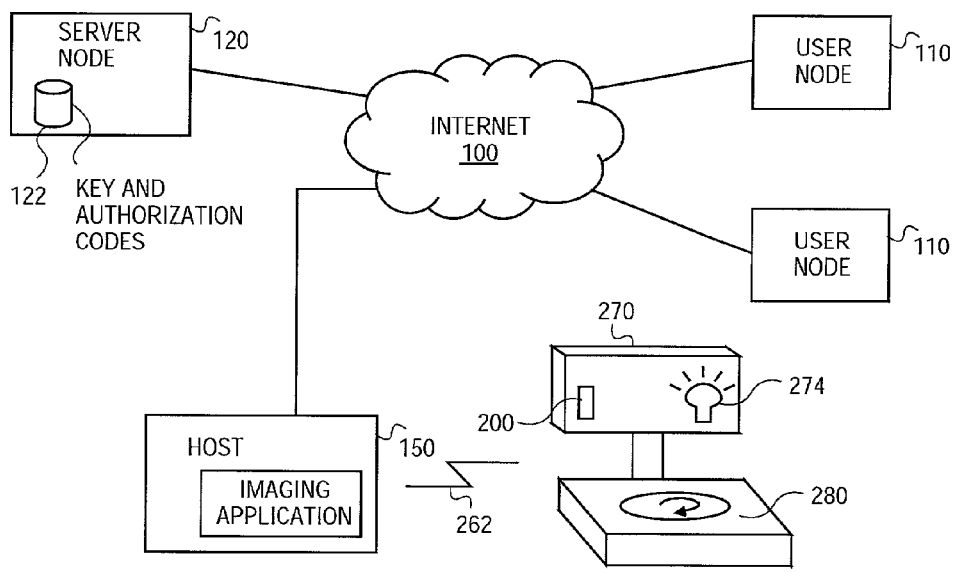
FIG. 3 is a block diagram of an alternative embodiment of the invention.

FIG. 3 is a block diagram of an alternative embodiment of the invention. Again, in this embodiment user nodes 110 are coupled to a distributed network 100. Also coupled to distributed node 100 is server node 120 and host 150. However, rather than being physically independent in this embodiment, the digitizer 270 and orientation unit 280 are coupled together to form a single integral unit. The unit communicates with the host by wireless link 262. Alternatively, the unit may be wired to the host by a USB or any other suitable wired communication link. A digitizer may use a linear image sensor 200 to image an object on the orientation fixture 280. A light source 274 may provide the lighting used by the image sensing array to discern the three-dimensional data. By integrating the digitizer and orientation unit, setup of the system is simplified. The digitizer may be rotatably coupled so that it can sweep its focal zone back and forth across an object positioned by the orientation fixture 280. This embodiment is particularly suitable for small-scale objects such as jewelry, in which the desired focal distance is relatively short. The other features discussed above in connection with FIG. 1 may equally be applied to embodiments as shown in FIG. 3.

Figure 4:
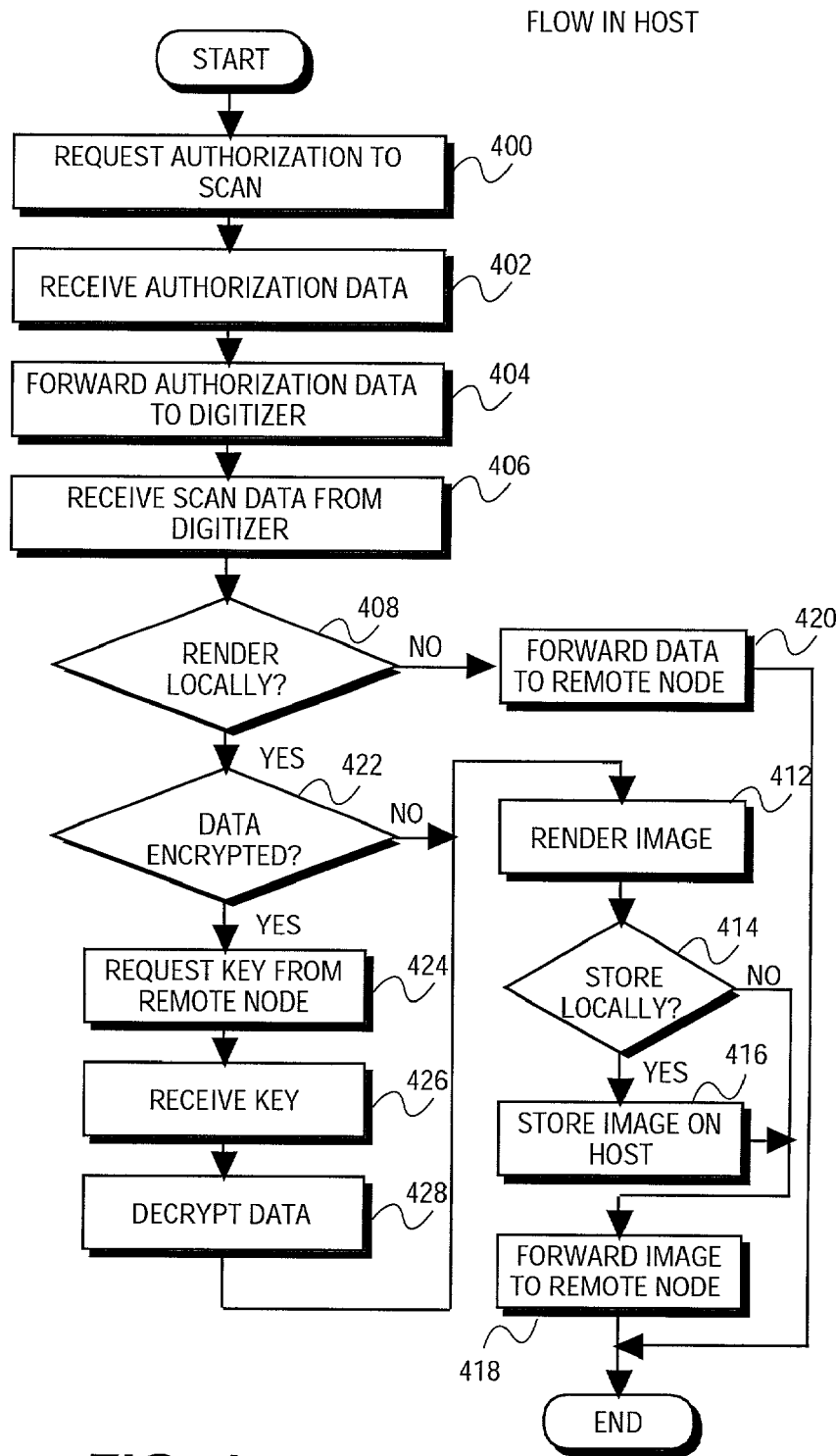
FIG. 4 is a flow diagram of operation of the host in one embodiment of the invention.

FIG. 4 is a flow diagram of operation of the host in one embodiment of the invention. At functional block 400, host requests authorization to scan from a remote node (such as the server node). At functional block 402, the host node receives authorization data across the distributed network. At functional block 404, the host forwards authorization data to the digitizer. At functional block 406 the host receives scan data from the digitizer.

At decision block 408 a determination is made whether the three-dimensional model should be rendered locally. If the rendering should not occur locally the data is forwarded to a remote node at functional block 420. The forwarded data may be encrypted or unencrypted, compressed or not compressed, and the forwarding protocol may be cell-based, packet-based or any other transmission protocol commonly used on distributed networks.

If the rendering should occur locally, a determination is made at decision block 422 if the data is encrypted. If the data is not encrypted at decision block 422, the image or three-dimensional model is rendered from the data at functional block 412. A determination is then made at decision block 414 whether the rendered model should be stored locally. If it is determined that the model should be stored locally, the model is stored on the host at functional block 416. If it is determined that the model should not be stored locally, the rendered model is forwarded to the remote node at functional block 418. In some cases, if the image is stored locally, it may not be forwarded to the remote node. In one embodiment of the invention, the authorization data indicates if local storage is permitted. If local storage is not permitted, the imaging application may be made responsible for electronic shredding of any temporary buffer space used in forwarding the scanned data.

If at decision block 422 it is determined that the data is encrypted, a request is made across the distributed network for keying information (or other information that permits decryption) from the remote node at functional block 424. The request may include payment for access privileges. Once the keying information is received at functional block 426, the host is able to decrypt the data at functional block 428. The flow then continues at functional block 412 as above described.

Figure 5:
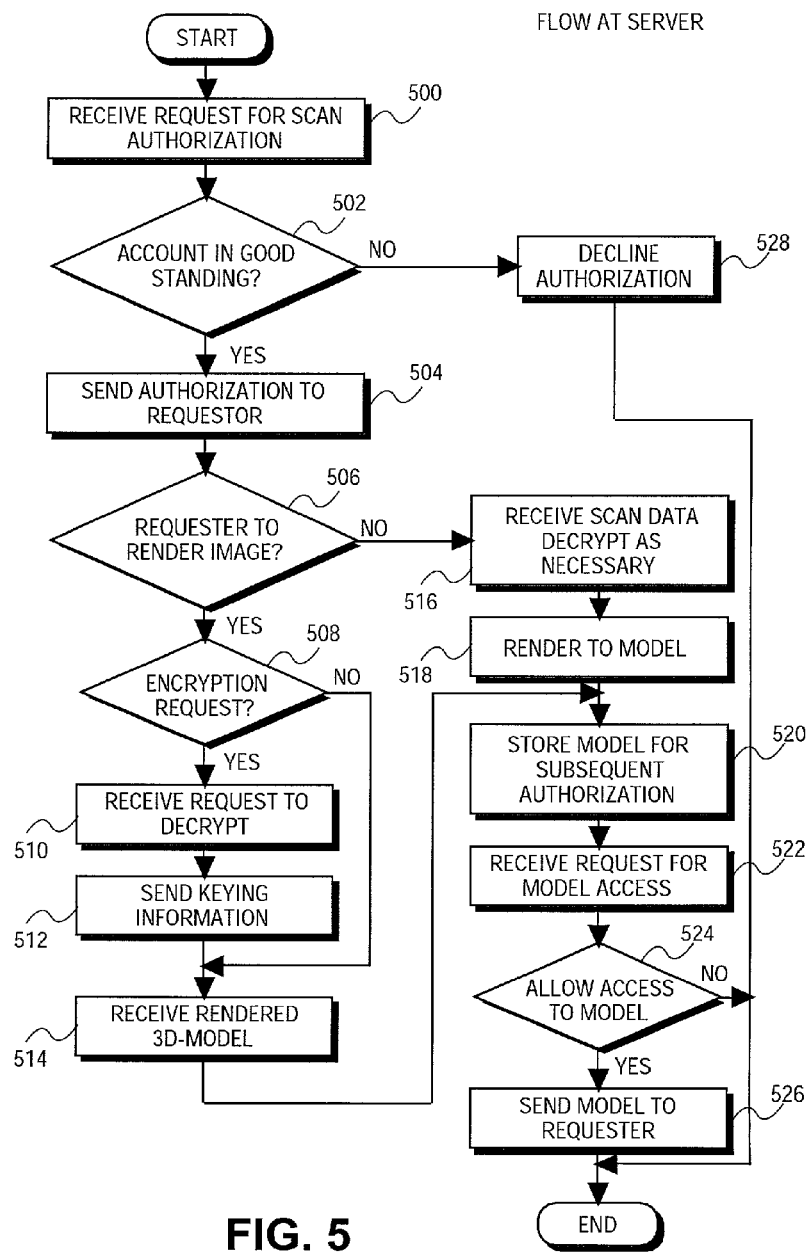
FIG. 5 is a flow diagram of operation at a server node in one embodiment of the invention.

FIG. 5 is a flow diagram of operation at a server node in one embodiment of the invention. At functional block 500 the server node receives a request for scan authorization. A determination is made at decision block 502 if the requesting account is in good standing. If it is not, authorization is declined at functional block 526. If the account is in good standing, the authorization data is sent to the requester at functional block 504. A determination is made at decision block 506 if the requester is to render the image. If the requester is to render the image, a determination is made at decision block 508 whether encryption is required. Requiring encryption may be at the option of the server node as part of the use authorization. If encryption is required, the server receives a request to decrypt at functional block 510. The server node may then send keying information (or other information that permits decryption) to the requester at functional block 512. If no encryption is required or after the keying information has been sent, the server node may receive the rendered three-dimensional model at functional block 514.

If at decision block 506 the requester is not to render the image, the server node receives the scan data and decrypts as necessary at functional block 516. The server then renders the three-dimensional model at functional block 518. After the three-dimensional model is rendered by the server or received by the server, the model is stored for subsequent distribution at functional block 520. Once stored, the server may provide the model to any arbitrary node or the distributed network.

At functional block 522, the request is received for access to a model. At decision block 524 a determination is made whether to allow access to the model to the requester. Such a determination may be made based on predetermined access privilege to different models, including whether the requester was the creator of the model, access privilege level established by the creator, or based on some payment for such access. If it is determined that access to the model should be allowed, the model is sent to the requester at functional block 526. The model may be sent in any form and may be encrypted for security. In some embodiments the requester may be given the option of the file type sent. Otherwise, access to the request is declined.

Figure 6:
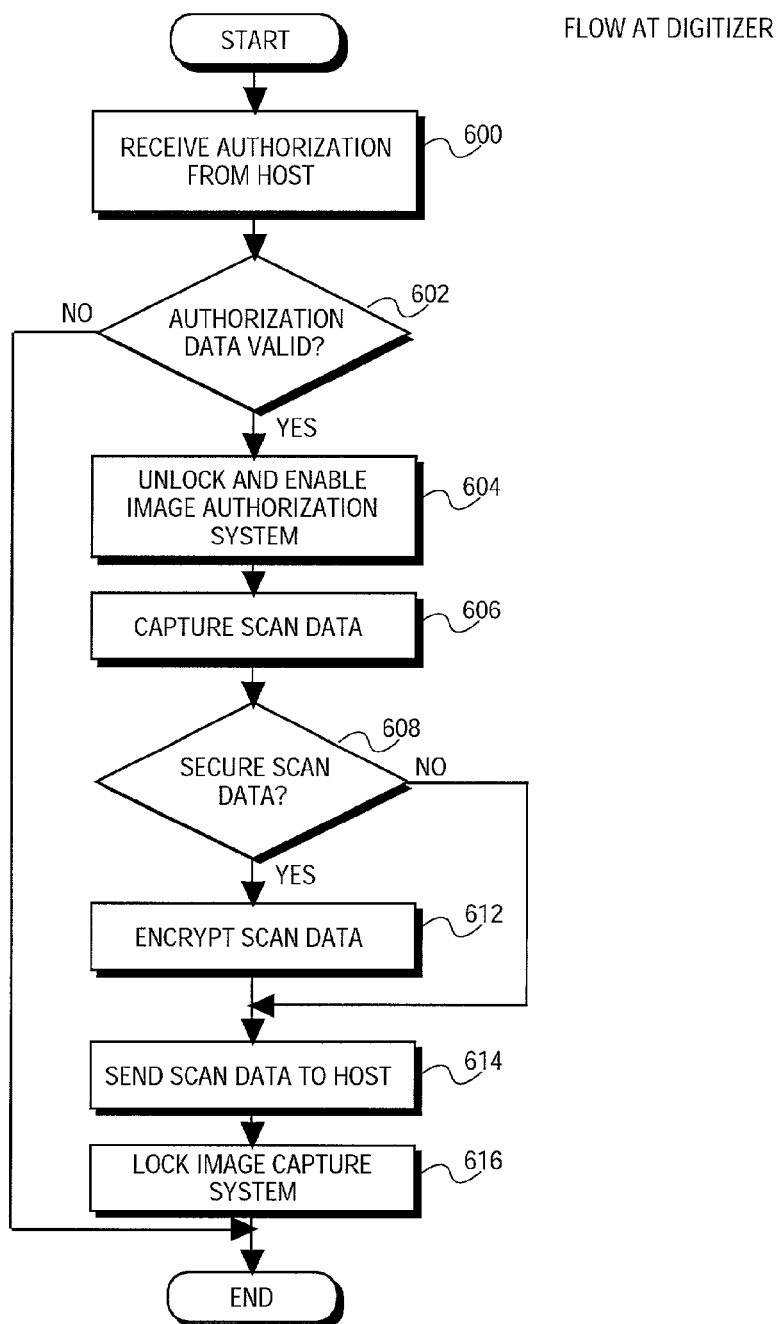
FIG. 6 is a flow diagram of operation in a digitizer in one embodiment of the invention.

FIG. 6 is a flow diagram of operation in a digitizer in one embodiment of the invention. At functional block 600, authorization data is received from the host. The determination is made at functional block 602 if the authorization data is valid. Authorization data may include a code and, for example, a digital signature for the imaging application to ensure that an authorized imaging application is operating on the host. If the authorization data is valid, the image capture system is unlocked and enabled at functional block 604. At functional block 606, the digitizer captures scan data for the object positioned by the orientation fixture. A determination is then made at decision block 608 whether the scan data should be secured. If the scan data should be secured, the digitizer may encrypt the data at functional block 612. If the data need not be secured or after encryption, the scan data may be sent to the host at functional block 614. At functional block 616, the image capture system is relocked.

In one embodiment the server node is able to control both the enablement of the imaging subsystem to operate and access to the data subsequently captured. This permits remote control of a widely distributed network of imaging subsystem having broad user appeal due to low cost and ease of operation.

Figure 7:
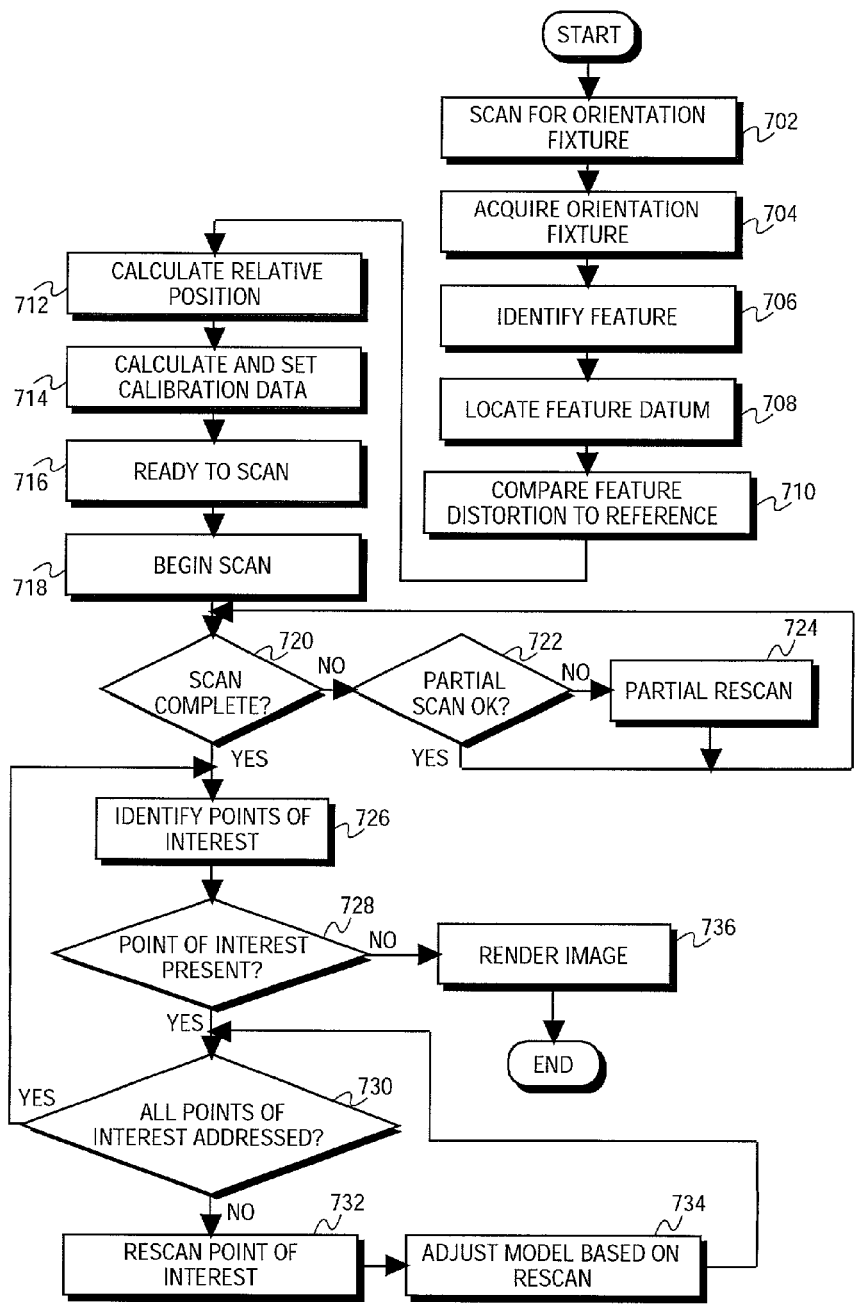
FIG. 7 is a flow diagram of setup and data capture in a digitizer of one embodiment of the invention.

FIG. 7 is a flow diagram of setup and data capture in a digitizer in one embodiment of the invention. At functional block 702, the digitizer scans for the orientation fixture. In one embodiment, this may take the form of the digitizer sweeping an arc around it looking for a distinctive feature. At functional block 704, the digitizer acquires the orientation fixture. At functional block 706, the digitizer identifies a feature on the digitizer from which it can derive certain information. A featured datum is located at functional block 708. The featured datum provides a reference from which, e.g., the center of the turntable, may be located. At functional block 710, feature distortion is compared to a saved reference value, for example, this distortion may either be of the feature or of the entire orientation fixture. Based on this comparison, the relative position is calculated at functional block 712. At functional block 714, the same distortion can be used to calculate and set calibration data to optimize the accuracy of subsequent scans based on existing conditions. At functional block 716, the digitizer becomes ready to scan.

At functional block 718, the digitizer begins to scan and capture data from which a three-dimensional model of the object being scanned may be derived. At decision block 720, a determination is made if the scan is complete. If the scan is not complete, a determination is made at decision block 722 if the partial scan is corrupt, anomalous, or otherwise unusable. If the data is not usable, a partial rescan may be performed for that region of the object at functional block 724. If at decision block 720 the scan is complete, the scan data is analyzed to identify points of interest. At functional block 726, those points of interest may include anomalous data, errors, features for which greater resolution is desirable, or any other facet of the object that warrants further investigation or review. A determination is made at decision block 728 whether any points of interest are present. If there are points of interest present, a determination is made at decision block 730 if all points of interest have been addressed. If all points of interest have not been addressed at functional block 732, the system rescans a portion of the object corresponding to a point of interest. This rescan may be conducted at a higher resolution than the original scan, the same resolution as the original scan, or even using an alternative image capture method. At functional block 734, the model is adjusted based on the rescan. Flow then returns to decision block 730 to determine if all points of interest have been addressed. If they have, the system returns to identify points of interest at functional block 726. In this manner, if the rescan adjustment creates additional points of interest, those will subsequently be picked up and addressed. If at decision block 728 no points of interest are present, the system renders the image at functional block 736.

Figure 8:
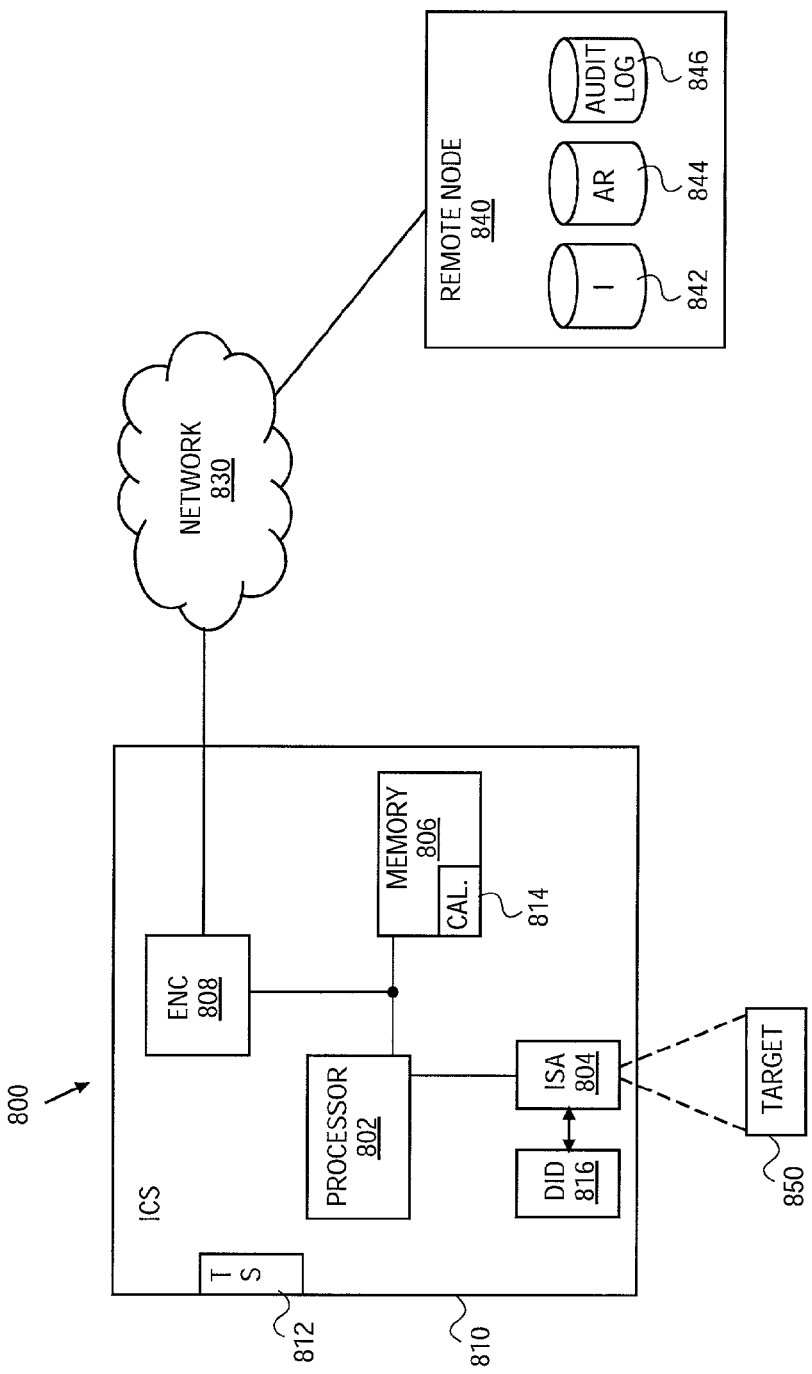
FIG. 8 is a block diagram of a network image capture system of one embodiment of the invention.

FIG. 8 is a block diagram of a network image capture system of one embodiment of the invention. In one embodiment, the image capture system (ICS) 800 is coupled through a distributed network 830 to a remote node 840. The ICS 800 may be a three dimensional capture system as described above or a more traditional two dimensional imaging system. Remote node 840 may include web servers and one or more databases including an image database 842 and access rights database 844 and a log database 846. These databases may be instantiated as a single database or plurality of related databases. Access rights may be user specified or automatically defined. In one embodiment, remote node 840 either monitors or controls image capture system 800.

If remote node 840 only monitors, it may only watch the state of the ICS 800. As used herein, "state information" may include any or all of the following: a time of event, an identification of the ICS, a network address of the ICS, a parameter of capture, a local access log and an automatically assigned index. In such embodiment, the remote node may not be able to prevent production of a fraudulent image record, but may be able to identify and, therefore, certify image records that have not been tampered with between capture and storage at the remote node 840. In one embodiment, Java® script or a Java® applet may be used to monitor the settings and activities of the ICS 800. If the remote node 840 can control the ICS 800, it can prevent local access to the digital record of the image captured or only allow local access to a copy at the digital record and can control the settings and other parameters of capture. In this manner, the remote node 840 can ensure that a digital record of an image captured received at the remote node 840 is authentic. In one embodiment, this control may be exercised through use of Java® script or a Java® applet sent from the remote node 840.

The ICS 800 may have a tamper resistant housing 810 which contains an image sensing array (ISA) 804 under the control of a processor 802. A tamper sensor 812 detects tampering with the housing 810 and signals the processor 802 when tampering is detected. Various mechanisms may be used for the tamper sensor 812 including switches tripped in response to opening of the housing. Alternatively, some feature such as a paper label inside the device may be used in conjunction with the ISA to detect tampering. For example, if the label is torn by opening the housing, subsequent images of the label captured by the ISA will show the tampering. In one embodiment, the tamper sensor 812 is a single use device like a fuse that once broken all images captured are suspect. In another embodiment, a code used for authentication may be stored in a battery backed up memory for which the battery backup is disconnected responsive to tampering with or opening the housing. The disconnection results in deletion of the necessary code after which authentication is disabled.

Image sensing array 804 may be used to capture an image of a target 850 under the control of processor 802. A memory 806 is coupled to the processor 802. In one embodiment, image capture system 800 is calibrated prior to distribution and calibration data 814 is retained in a section of the memory 806. The processor 802 controls the parameters of capture which may include without limitation exposure setting, spectral filter setting, illumination level, resolution of capture, orientation of object, orientation of scanning and use of the calibration file. These parameters may be provided by the remote node 840 in certain instances, by a local host (not shown) or automatically determined within the ICS 800. Based on the parameters, an image capture of the target 850 may occur.

A data insertion device 816 interacts with the ISA 804 to "mark" a data stream produced by the ISA 804. The data insertion device (DID) 816 may take any of several forms. In one embodiment, a light source such as, for example a light emitting diode (LED) "sprays" light in a predetermined way on to the ISA 804 during capture. In another embodiment, the DID 816 causes a precapture of some other optical reference such as, a serial number, bar code or other such reference contained within the apparatus prior to capture of the target. The precapture may then be encoded by the processor 802 within a capture record.

In another embodiment, the DID 816 injects an electrical marker into the data read from the ISA 804. For example, a resistive network may be used to create a unique electrical identity for the device. The resistance value may be read by an analog to digital (A/D) converter to identify a single code for the device that may be infused into the data stream. In one embodiment, a same A/D that reads the ISA may be used to read the resistor values. A series of switches may alternatively be used to create a unique code. In another embodiment, the DID 816 inserts data stored in a secure memory element into the data stream to act as a marker.

Typical charge coupled devices (CCD) have a number of bits that are not used during image capture. These include dark level bits and dummy bits typical around the periphery of the ISA 804. These bits may provide a substantially unique signature for the ISA 804 unaffected by an image capture such that the bits may be compared with expected values (from calibration) to identify if an image record came from a particular CCD. It is also noted that ISA's by virtue of manufacturing variance typically have a unique fingerprint in that some pixels are more responsive than others. This fingerprint can be derived from the calibration data.

In one embodiment, an encryption engine 808 may optionally be provided to encrypt the digital record of the capture created by the image sensing array 804 prior to passing it from the tamper resistant housing 810. In one embodiment, public key encryption is used. In one embodiment, an encryption engine 808 also includes a one-way hash engine. Alternatively, encryption may be performed by the processor using software resident in the system, firmware, or for example, a Java® applet downloaded to the processor 802 as part of the image capture process. This permits keying information to be externally established and changed without reconfiguration of the ICS. In this manner, the authenticity of the data captured and subsequently displayed may be certified.

In one embodiment, the processor 802, memory and related components, may be packaged in tamper resistant semiconductor packaging known in the art. In one embodiment, the ICS may employ a subset of techniques used with secure coprocessors analogous to those described in U.S. Pat. No. 5,757,919 entitled CRYPTOGRAPHICALLY PROTECTED PAGING SUBSET SYSTEM assigned to Intel Corporation.

Figure 9:
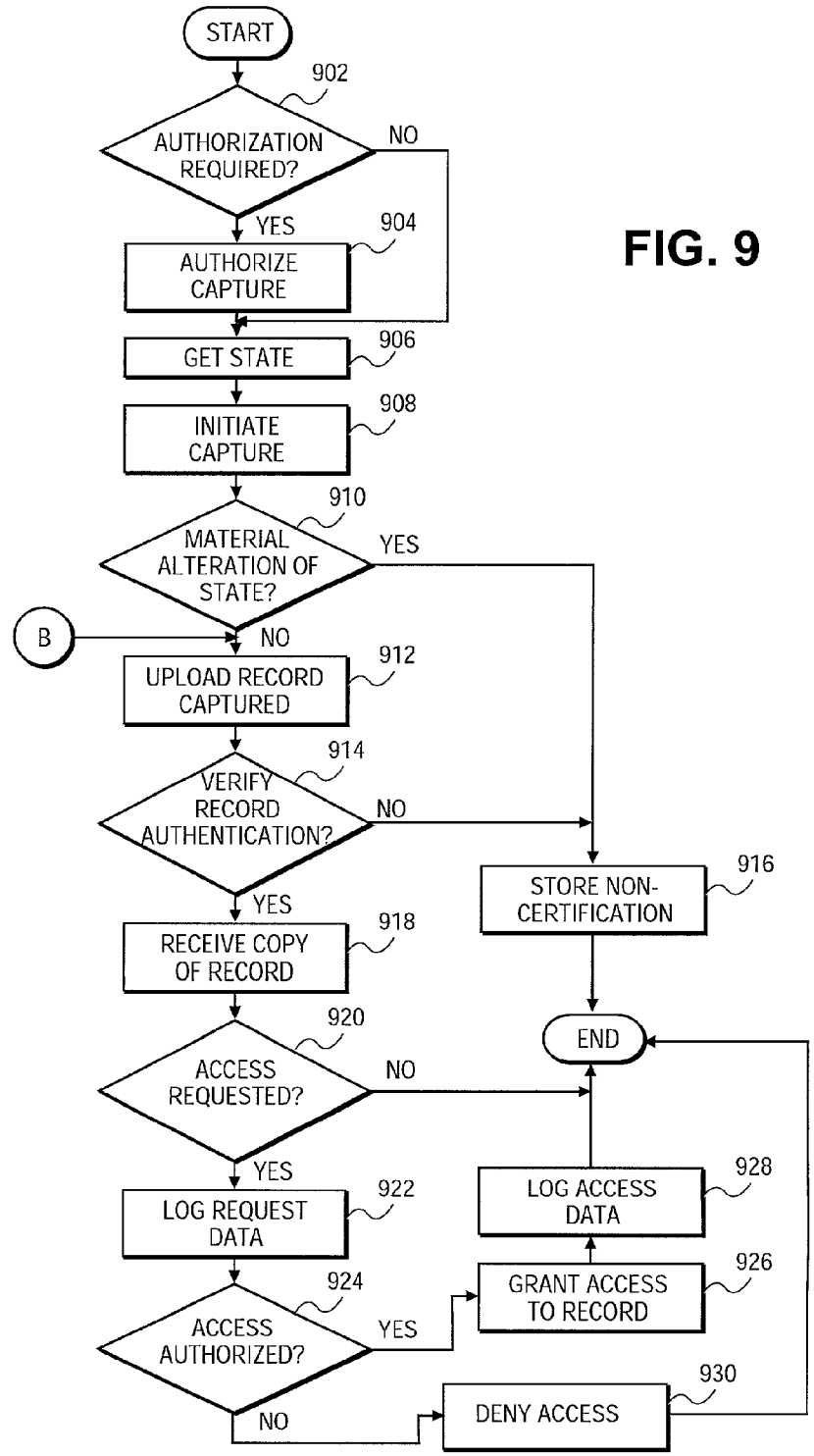
FIG. 9 is a flow diagram of a system of one embodiment of the invention.

FIG. 9 is a flow diagram of a system of one embodiment of the invention. At decision block 902, a determination is made if authorization is required to capture an image. If authorization is required, the capture is authorized at functional block 904. In one embodiment, the authorization is provided by a remote node. In another embodiment, authorization may be provided through, e.g. a prepaid magnetic card or other payment vehicle. Then after authorization or if no authorization is required, the state information from the image capture system is acquired at functional block 906. At functional block 908, a capture is initiated. At decision block 910, a determination is made based on the state information monitored whether any unauthorized material alteration of the state occurred during the capture sequence. If no material alteration occurred, at functional block 912, the data captured may be uploaded to a remote node and may be subsequently certified. In some embodiments, part of the uploading sequence includes encrypting a digital record of the image captured. In some embodiments, the state information may be encoded into the digital record along with the image. At decision block 914, the uploading node verifies that the data is authentic by checking for characteristics expected to be present in an authentic file created by the image capture system. If a material alteration occurred or verification fails, the monitoring system notes that the resulting record cannot be certified authentic at functional block 916.

If verified at functional block 918, the record is certifiable and a copy of the record (or the relevant portion thereof) is stored in a secure environment such as on a remote node. At decisional block 920, a determination is made if a request to access the record has been made. Access requests includes requests to view, copy, and modify the record. If a request to access the record is received, information about the request is stored in a log at functional block 922. Then at decision block 924, an access rights database is checked to determine whether the requestor is authorized to access the record. If the access is authorized, access is granted at functional block 926. If access is granted, additional log entries are made regarding the type of access and parameters of access for the record at functional block 928. In one embodiment, log entries may include who accessed the record, the time accessed, any approval of the filing and network address of the accessor and what aspects of the image record was accessed. In some embodiments, if access is to modify the record, a duplicate of the unmodified record is automatically maintained so that at least one unmodified copy exists. The length that such an unmodified escrow copy is maintained may vary depending on the useful life of the image record. If access is not authorized at decision block 924, access is denied at functional block 930. In one embodiment, if a user of the ICS so specifies, the ICS or remote node automatically publishes the certified image to a set of networked recipients. In such embodiment, the access log may track access and approvals of such recipients.

Figure 10:
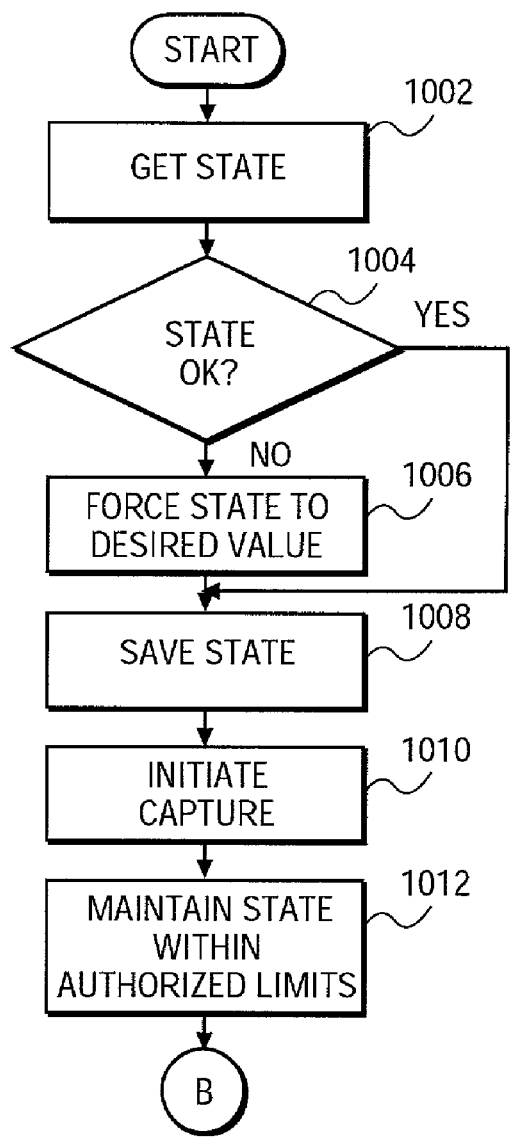
FIG. 10 is a flow diagram of an alternative embodiment of a system of the invention.

FIG. 10 is a flow diagram of an alternative embodiment of a system of the invention. At functional block 1002, the state of the image capture system is acquired. A determination is made at functional block 1004 if the state falls within a defined range of acceptable states. If the state does not fall within that range, the state is forced to a desired value at functional block 1006. If the state is acceptable or after forcing the state, the then existing state information is saved at functional block 1008. Capture is initiated at functional block 1010 and the state is maintained within the authorized limits throughout the capture process at functional block 1012. Flow then continues as in FIG. 9 at functional block 912.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
    monitoring a state of an image capture system (ICS) while it captures an image of a target;
    making a digital record of the image;
    certifying from the record of the image that no unauthorized material alteration of the state occurred during capture of the image.
2. The method of claim 1 further wherein certifying comprises:
    encoding the record to allow detection of modification to the capture process and modification of the record itself.
3. The method of claim 1 wherein certifying comprises:
    retaining a duplicate of the record of the image; and preventing modification of the duplicate.
4. The method of claim 1 further comprising:
    encrypting the record of the image.
5. The method of claim 1 further comprising:
    incorporating markers of state in the record of the image.
6. The method of claim 1 further comprising:
    preventing subsequent modification of the record of the image.
7. The method of claim 1 further comprising:
    maintaining an audit log of access to the record of the image.
8. The method of claim 7 wherein maintaining the audit log comprises:
    retaining a log record of at least one of who accessed the record of the image, a location of an accessor, when the record of the image was accessed, and what aspect of the record of the image was accessed.
9. The method of claim 7 wherein maintaining the audit log comprises:
    maintaining a record of parties approving the record of the image.
10. The method of claim 1 further comprising:
    retaining state information corresponding to the capture, wherein the state information includes at least one of: a time of event, an identification of the ICS, a network address of the ICS, a parameter of capture, a local access log and an automatically assigned index.
11. A computer readable storage media containing executable computer program instructions which when executed cause a digital processing system to perform a method comprising:
    monitoring a state of an image capture system (ICS) while it captures an image of a target;
    making a digital record of the image;
    certifying from the record of the image that no unauthorized material alteration of the state occurred during capture of the image.
12. A method comprising:
    monitoring a networked image capture system (ICS) while the ICS performs a capture of an image of a target;
    making a digital record of the image;
    certifying from the record of the image that no unauthorized material alteration of the state occurred during capture of the image.
13. The method of claim 12 further comprising:
    automatically uploading data captured by the ICS to a remote node.
14. The method of claim 12 further comprising:
    publishing the record of the image to a defined set of networked recipients.
15. The method of claim 12 further comprising:
    maintaining an escrow copy of the data at a remote node secure from modification or destruction to guarantee an authenticity of the data.
16. The method of claim 12 further comprising:
    defining access rights to the digital record of the image.
17. The method of claim 16 wherein access rights are automatically defined.
18. The method of claim 12 further comprising:
    enabling the ICS from the remote node.
19. The method of claim 12 wherein the monitoring is performed from a remote node.
20. A computer readable storage media containing executable computer program instructions which when executed cause a digital processing system to perform a method comprising:
    monitoring a networked image capture system (ICS) while the ICS performs a capture of an image of a target;
    making a digital record of the image;
    certifying from the record of the image that no unauthorized material alteration of the state occurred during capture of the image.
21. A method comprising:
    preventing an unauthorized material alteration of a state of an image capture system (ICS) during a capture of an image of a target;
    making a digital record of the image; and
    preventing aa unauthorized material alteration of data initially recorded in the record.
22. The method of claim 21 further comprising:
    maintaining an audit log of access to the record of the image.
23. The method of claim 22 wherein maintaining the audit log comprises:
    retaining a log record of at least one of who accesses the record of the image, a location of an accessor, when the record of the image was accessed and what aspect of the image record was accessed.
24. A computer readable storage media containing executable computer program instructions which when executed cause a digital processing system to perform a method comprising:
    preventing an unauthorized material alteration of a state of an image capture system (ICS) during a capture of an image of a target;
    making a digital record of the image; and
    preventing an unauthorized material alteration of data initially recorded in the record.

25. A method comprising:
preventing an unauthorized material alteration of a state of a networked image capture system (ICS) during a capture of an image of a target;
making a digital record of the image; and
preventing an unauthorized material alteration of data initially recorded in the record of the image.

26. The method of claim 25 further comprising:
automatically uploading data captured by the ICS to a remote node.

27. The method of claim 25 further comprising:
maintaining an escrow copy of the data secure from modification or destruction to guarantee an authenticity of the data.

28. The computer readable storage media of claim 25 which when executed cause a digital processing system to perform a method further comprising:
preventing an unauthorized material alteration of a state of a networked image capture system (ICS) during a capture of an image of a target;
making a digital record of the image; and
preventing an unauthorized material alteration of data initially recorded in the record.

29. An apparatus comprising:
an image sensing array (ISA) disposed within an assembly; and
a data insertion device disposed within the assembly to modify a data stream corresponding to an image capture in a known way.

30. A method of claim 29 further comprising:
an encryption engine disposed within the assembly to encrypt the data stream within the assembly.

31. A method of claim 29 further comprising:
a tamper resistant assembly.

32. The apparatus of 29 further comprising:
a storage unit storing calibration data that defines a signature of inherent characteristics unique to the ISA.

33. The apparatus of claim 29 wherein the data insertion device comprises:
a light source positioned to illuminate a portion of the ISA in a known way during capture.

34. The apparatus of claim 29 wherein the data insertion device comprises:
a optical reference within the apparatus disposed to be imaged by the ISA as a precursor to capture of a target image.

35. The apparatus of claim 29 wherein the data insertion device comprises:
a reader to read pixels of the ISA masked from a field of view of the ISA to generate a pattern substantially unaffected by an image capture.

36. The apparatus of claim 29 wherein the data insertion device comprises:
a plurality of resistors defining a unique electrical signature.

37. The apparatus of claim 29 wherein the data insertion device comprises:
a memory retaining a marker data set for insertion in the data stream.

* * * * *

UNITED STATES PATENT AND TRADEMARK OFFICE
CERTIFICATE OF CORRECTION

PATENT NO. : 7,050,585 B2  
APPLICATION NO. : 09/927730  
DATED : May 23, 2006  
INVENTOR(S) : Knighton et al.

Page 1 of 1

It is certified that error appears in the above-identified patent and that said Letters Patent is hereby corrected as shown below:

In Claim #21, line 6, please delete "aa" and insert -- a --.

Signed and Sealed this

Twelfth Day of August, 2008

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,050,585 B2 | Page 1 of 1 |
| APPLICATION NO. | : 09/927730 | |
| DATED | : May 23, 2006 | |
| INVENTOR(S) | : Knighton et al. | |

It is certified that error appears in the above-identified patent and that said Letters Patent is hereby corrected as shown below:

Column 12, in Claim #21, line 46, please delete "aa" and insert -- a --.

This certificate supersedes the Certificate of Correction issued August 12, 2008.

Signed and Sealed this

Sixteenth Day of September, 2008

JON W. DUDAS
*Director of the United States Patent and Trademark Office*